(12) United States Patent
Condon

(10) Patent No.: US 7,278,450 B1
(45) Date of Patent: Oct. 9, 2007

(54) COUPLING ASSEMBLY FOR SECUREMENT IN THE OPEN END OF A PIPE

(75) Inventor: Duane R. Condon, Ramona, CA (US)

(73) Assignee: Sioux Chief Mfg. Co., Inc, Peculiar, MO (US)

( * ) Notice: Subject to any disclaimer, the term of this patent is extended or adjusted under 35 U.S.C. 154(b) by 0 days.

(21) Appl. No.: 11/215,858

(22) Filed: Oct. 12, 2005

(51) Int. Cl.
*F16L 55/10* (2006.01)

(52) U.S. Cl. ............... 138/89; 138/96 R; 285/348; 220/327

(58) Field of Classification Search .......... 138/90, 138/89, 109, 96 R, 96 T; 285/348; 277/622, 277/626; 220/327, 328, 236
See application file for complete search history.

(56) References Cited

U.S. PATENT DOCUMENTS

| | | | | |
|---|---|---|---|---|
| 402,600 | A | 5/1889 | Kemp | 220/235 |
| 2,443,187 | A * | 6/1948 | Hobbs | 285/107 |
| 2,490,566 | A * | 12/1949 | Wishart | 277/622 |
| 3,291,156 | A | 12/1966 | Corsano | 138/89 |
| 3,451,585 | A | 6/1969 | Jorgensen | 220/327 |
| RE27,011 | E | 12/1970 | Jorgensen | 220/327 |
| 3,599,825 | A | 8/1971 | Jorgensen | 220/327 |
| 3,805,992 | A | 4/1974 | Jorgensen | 220/327 |
| 4,269,230 | A | 5/1981 | Pepper | 138/89 |
| 4,493,344 | A | 1/1985 | Mathison et al. | 138/89 |
| 4,817,671 | A | 4/1989 | Mathison et al. | 138/89 |
| 5,044,403 | A | 9/1991 | Chen | 138/89 |
| 5,230,437 | A | 7/1993 | Kelly | 138/89 |
| 5,307,841 | A | 5/1994 | Condon | 138/90 |
| 6,003,557 | A * | 12/1999 | Brelig et al. | 138/89 |
| 6,170,530 | B1 | 1/2001 | Steblina | 138/89 |
| 6,453,603 | B1 | 9/2002 | Baker | 43/124 |
| 6,513,549 | B2 | 2/2003 | Chen | 138/89 |
| 6,688,336 | B2 | 2/2004 | Trichard | 138/89 |
| 6,745,795 | B2 | 6/2004 | McGivery | 138/89 |
| 2004/0168734 | A1 | 9/2004 | Serret | 138/89 |

FOREIGN PATENT DOCUMENTS

| | | |
|---|---|---|
| GB | 2 117 863 A | 10/1983 |
| GB | 2161993 A | 1/1986 |
| JP | 354145850 A | 11/1979 |

* cited by examiner

*Primary Examiner*—Patrick F. Brinson
(74) *Attorney, Agent, or Firm*—Erickson & Kleypas, LLC

(57) ABSTRACT

A coupling assembly for inserting into and coupling with the end of an open pipe, such as a cleanout pipe used in plumbing systems and wherein the coupling assembly may be used as a plug. The coupling assembly includes a collar secured around a medial portion of the cylindrical body of reduced diameter. The collar is driven downward by threadable advancement of a plurality of screws for squeezing a seal against the collar and a downwardly and outwardly projecting shoulder which causes the seal to expand outward to seal against the inner wall of the pipe. The screws simultaneously bite into the inner wall of the pipe to help secure the coupling assembly in place.

20 Claims, 3 Drawing Sheets

COUPLING ASSEMBLY FOR SECUREMENT IN THE OPEN END OF A PIPE

BACKGROUND OF THE INVENTION

This invention relates to coupling devices for removable coupling of a plumbing fitting, such as a plug that is inserted into and adjusted to seal non-threaded pipes used in plumbing systems.

It is known in the field of plumbing to install cleanout pipes in communication with a waste water pipe system so that objects lodged in the system may be removed through use of cables or other devices introduced into the system through the clean out pipe. Cleanout pipes are typically unthreaded and therefore must be capped at least during pressure testing of the waste water pipe system subsequent to installation. Preferably, the cleanout pipe is capped in a temporary manner so that access may be readily had without having to cut the pipe, as would be necessary for example, with a cap applied with adhesive.

Devices for plugging open-ended, non-threaded pipes are known to incorporate O-rings that seal against the inner wall of a pipe when compressed. Such devices, however, generally comprise a two-piece body in which a secondary clamping member is drawn upward or inward toward a primary clamping member by a relatively large screw or bolt to compress an O-ring seal positioned therebetween. The screw extends through apertures in both clamping members. These apertures must be sealed in addition to the seal already required at the gap between the device and the inner wall of the associated pipe. In addition, these devices generally require the use of a relatively large wrench to loosen or tighten the screw or bolt and generally cannot be installed using cordless screwdrivers which are becoming more prevalent in their use.

Such prior art seals rely solely on the compression of the seal against the inner surface of the pipe to hold the plug or other fitting in place. It is possible that during pressure testing of the plumbing system that the pressure in the line might be sufficient to blow such a plug out of the end of the pipe.

In addition, if it becomes necessary to seal the pipe at a position well within the bore rather than near the open end of the bore it may be possible to modify prior art devices to achieve this aim but according to the common prior art designs such a modification would require providing an elongated clamping member necessary to hold the shoulder and base elements together.

There remains a need for an improved coupling assembly for securing plugs and the like in the open end of a smooth walled pipe which is easy to install and forms an airtight seal between the inner wall of the pipe and the outer surface of the coupling assembly and which does not rely solely on the compression of the sealing means for securing the assembly in the open end of a pipe.

BRIEF DESCRIPTION OF THE INVENTION

A coupling assembly securable in the open end of a pipe comprises a cylindrical body including an upper portion, a medial portion and a shoulder. The medial portion extends below the upper portion and has an outer diameter that is smaller than an outer diameter of the upper portion. The shoulder extends below and projects outward from the medial portion. A plurality of channels are formed in the upper portion and extend from an upper end to a lower end thereof.

A pliable seal is disposed around the medial portion above the shoulder. A compression collar is disposed around the cylindrical body above the seal and includes a lower surface that is positioned proximate the seal. A screw is threadingly advanceable through each of the channels in the upper portion of the cylindrical body to engage an upper surface of the collar. The screws are threadingly advanceable downward to push the collar downward and against the seal, compressing the seal between the collar and the shoulder of the cylindrical body causing said seal to protrude radially outward.

The screws may be disposed proximate the outer margin of the upper portion of the cylindrical body so that they engage both the cylindrical body around the channels and the inner wall of the pipe, cutting into the inner wall of the pipe as they are driven downward in order to securely hold the coupling assembly within the pipe. This is of particular utility if the coupling assembly is to be used as a plug to seal the end of a plumbing pipe during pressure testing in which case the device may be exposed to pressures that would otherwise tend to cause the seal to fail and/or expel the device from the pipe.

Other advantages of the invention will become apparent from the following description taken in connection with the accompanying drawings, wherein is set forth by way of illustration and example an embodiment of the present invention.

DETAILED DESCRIPTION

Figure 1:
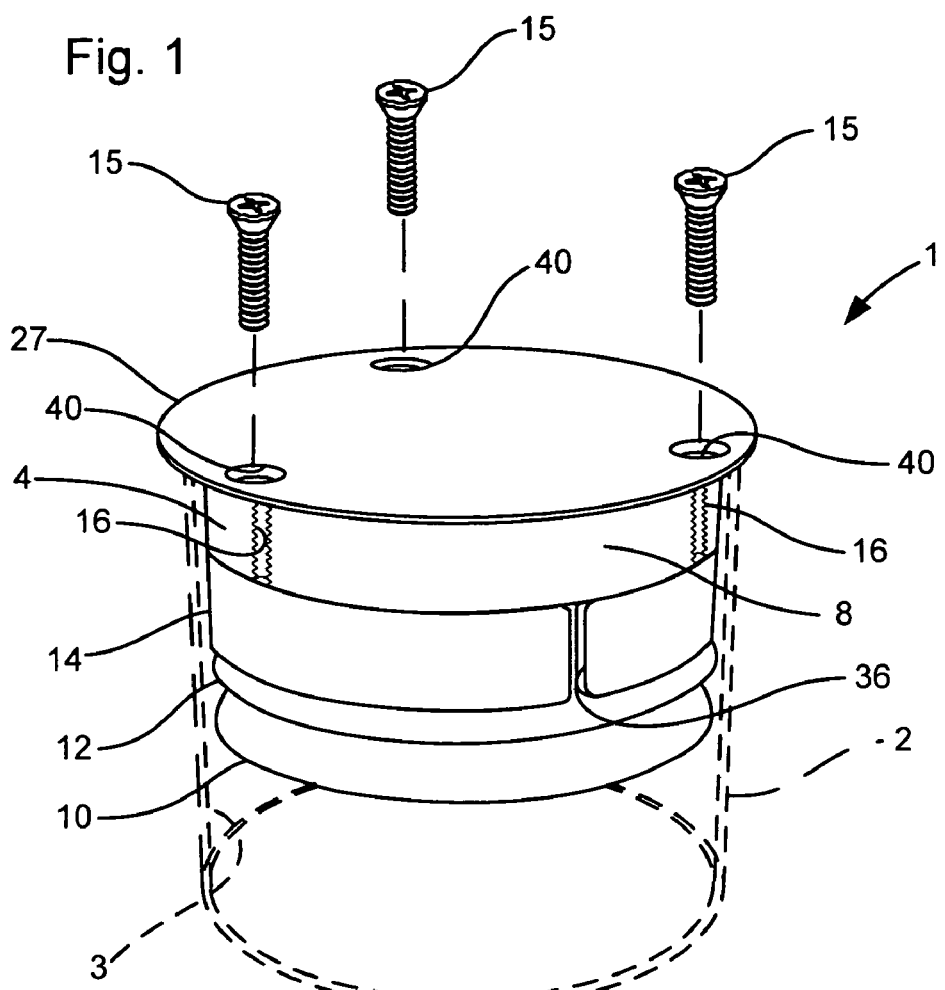
FIG. 1 is a perspective view of a pipe plug showing, in phantom lines, a pipe into which the pipe plug is insertable.
Figure 2:
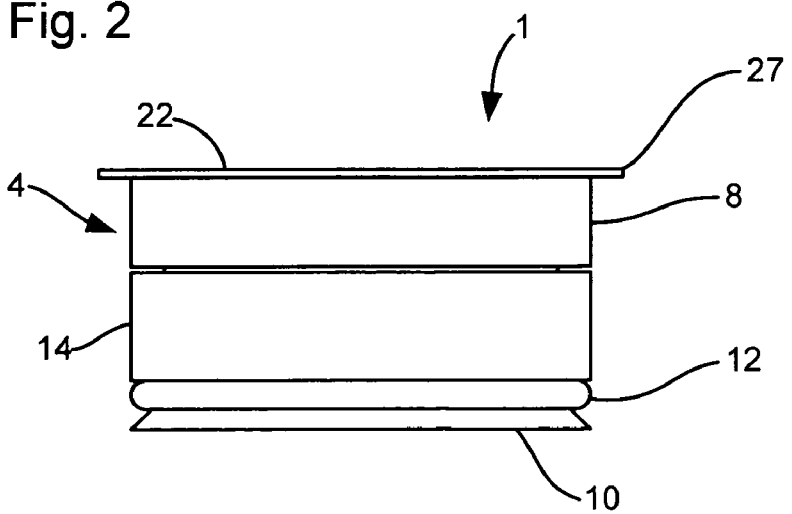
FIG. 2 is a front elevation of the pipe plug as shown in FIG. 1.
Figure 3:
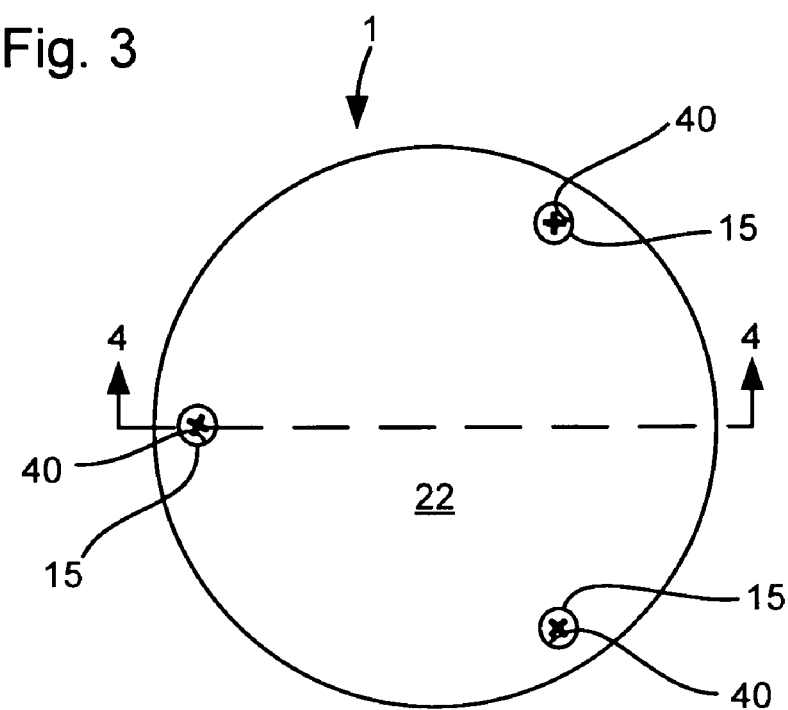
FIG. 3 is a top plan view of the pipe plug.
Figure 4:
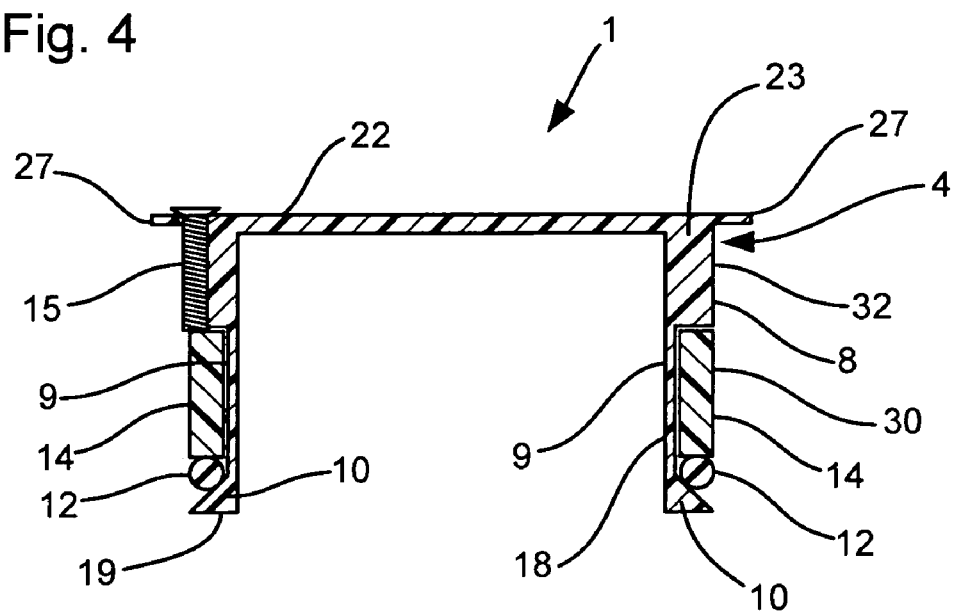
FIG. 4 is cross sectional view of the pipe plug taken along line 4—4 in FIG. 3.

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring now to FIGS. 1 through 6 of the drawings, there is shown a pipe plug indicated by the reference numeral 1 and incorporating an improved coupling assembly for coupling the pipe plug to the end of a pipe 2 having a pipe bore 3, such as a cleanout pipe used in plumbing systems. As used herein directional references will be made with reference to the orientation of the pipe plug 1 as shown in FIGS. 1 and 4–6 with the terms upper, top and above referring to the direction extending to the top of the page and the terms lower, bottom and below referring to the direction extending toward the bottom of the page.

The plug 1 includes a cylindrical body 4 having an upper portion 8, a medial portion 9 having a reduced outer diameter relative to the upper portion 8, and a shoulder 10 projecting radially outward and downward from the medial portion 9. A pliable seal, such as an O-ring 12, is positioned around medial portion 9, abutting against the shoulder 10, and a compression ring or collar 14 is positioned around the medial portion 9 above the O-ring 12. Screws 15 extending through channels or grooves 16 formed in the upper portion 8 of the cylindrical body 4 are threadingly advanceable downward to drive the compression collar 14 against the O-ring 12, to compress the O-ring 12 between collar 14 and shoulder 10 causing the O-ring 12 to protrude radially outward. When the plug 1 is installed in the end of a pipe 2, the outward protrusion of the O-ring 12 causes a seal to form between the O-ring 12, the inner surface of the pipe 2 and the outer surface of the cylindrical body 4.

As shown in the drawings, the cylindrical body 4 is hollow with a bore 18 extending into the cylindrical body 4 from a lower end 19 thereof. A closure member or wall 22 is connected to the cylindrical body and extends across the bore 18 at an upper end 23 of the cylindrical body 4 closing the upper end 23. It is foreseen that the closure member 22 could be positioned at other positions relative to the cylindrical body 4 including proximate the lower end 19 thereof or anywhere between the lower end 19 and upper end 23. If the closure member 22 is positioned at the lower end 19 of cylindrical body 4, the bore 18 would be described as extending into the cylindrical body 4 from the upper end 23.

Figure 5:
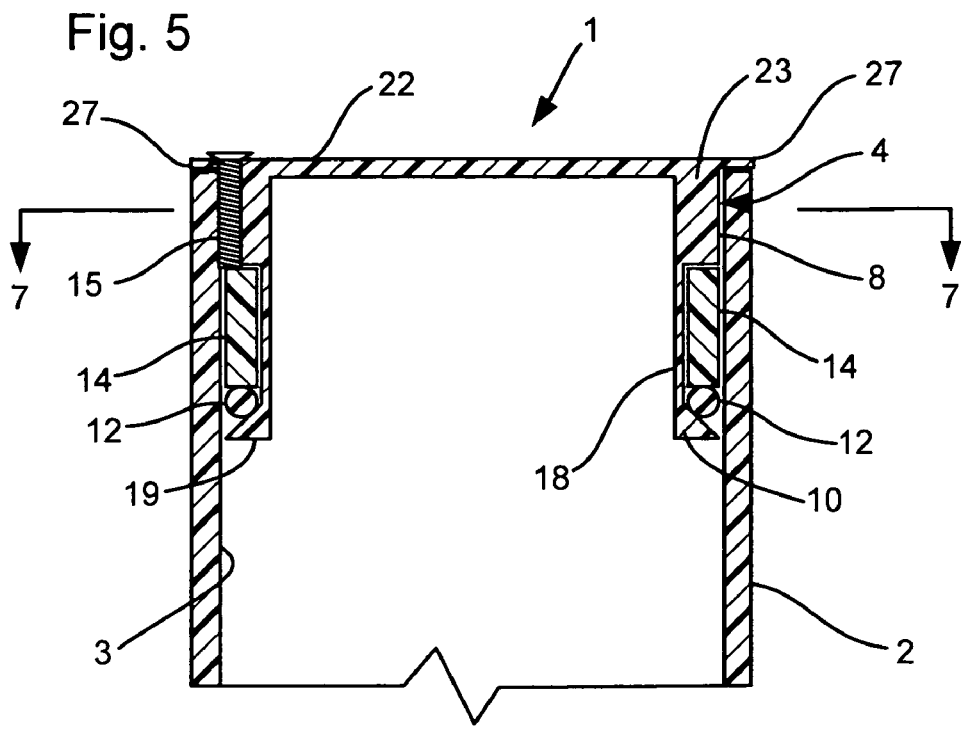
FIG. 5 is a cross sectional view similar to FIG. 4 and showing the pipe plug inserted into the end of a pipe.
Figure 6:
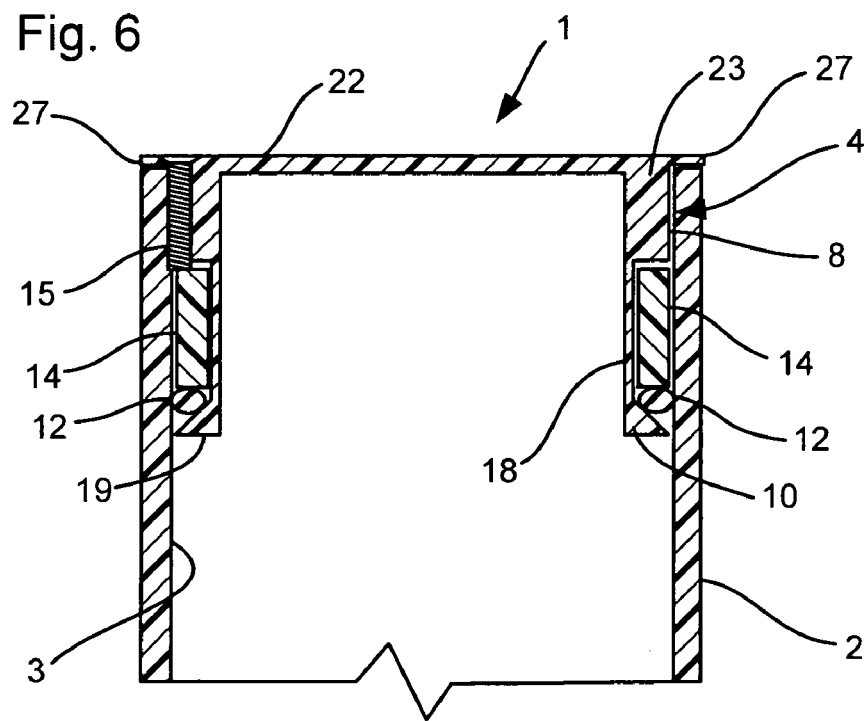
FIG. 6 is a cross sectional view similar to FIG. 5 showing a compression collar driven downward to compress and deform a seal to engage an inner wall of the pipe.

A mounting flange 27 projects radially outward from the cylindrical body 4, preferably adjacent the upper end 23 thereof for use in supporting the plug 1 on the end of a pipe 2. Referring to FIGS. 5 and 6, the outer diameter of the mounting flange 27 is sized to be larger than the inner diameter of the pipe 2 and approximately equal to the outer diameter of the pipe 2. As illustrated, the mounting flange 27 projects radially outward from the upper end 23 of cylindrical body 4 to engage the end of the pipe 2 to be sealed thus preventing over insertion of the plug 1 into the pipe bore 3.

The closure member 22, positioned at the upper end 23 of the cylindrical body 4 generally presents a flat, planar surface with the cylindrical body upper end 23 and the flange 27. The flange 27 is typically relatively thin to present a relatively low profile above the end of a pipe 2 to which the plug 1 is secured. The cylindrical body 4 could have a solid core, but the hollow core facilitates molding, conserves material and reduces weight.

The diameter of the upper portion 8 of the cylindrical body 4 is sized to be slightly smaller than the inner diameter of the pipe 2 in which the plug 1 is to be installed. The medial portion 9 may be described as being defined by a recess formed in the cylindrical body 4 below the upper portion 8. The diameter of the medial portion 9 is reduced relative to the upper portion 8 to accommodate the compression collar 14. In the embodiment shown, the compression collar 14 comprises a split annular ring that fits around the medial portion 9 of the cylindrical body 4. The collar 14 is approximately equal in thickness to the depth of the recess forming the medial portion 9 of cylindrical body 4 so that an outer surface 30 of the collar 14 generally extends flush with an outer surface 32 of the upper portion 8.

The shoulder 10 flares or slopes downward and radially outward from a lower end of the medial portion 9 and may generally be described as being formed by the same recess that defines the medial portion 9. The outer diameter of the lower edge of the shoulder 10 typically approximates the diameter of the upper portion 8 of the body 4.

The cylindrical body 4, the closure member 22 and the mounting flange 27 may be constructed as one piece or may be formed from individual pieces secured together by gluing, welding, heat bonding or the like. Typically, the cylindrical body 4, closure member 22 and flange 27 are formed of a resilient, yet relatively light weight material such as plastic that is shaped in a mold. An appropriate plastic material commonly used to form plumbing fixtures includes polyvinyl chloride.

The compression collar 14 is typically formed separately from the body 4 and may be split to include a gap 36 so that the collar 14 can be opened at the gap 36 to fit around the medial portion 9 of the body 4. Alternatively, in the case where the sections of the cylindrical body 4 are formed separately, the compression collar 14 may be slipped onto the medial portion 9 prior to attachment of the shoulder 10.

The seal 12 shown comprises a pliable, rubber O-ring disposed around the medial portion 9 of the cylindrical body 4 adjacent and overlapping with the shoulder 10. As shown in FIGS. 1 and 4–6, the seal 12 is generally located at the juncture between the medial portion 9 and the shoulder 10, which as used herein may be described as extending around the medial portion 9 and above or upward from the shoulder 10.

In the embodiment shown, the channels or grooves 16 for receiving the screws 15 are generally formed as semi-cylindrical grooves 16 extending into the upper portion 8 of the cylindrical body 4 from the outer surface 32 thereof. The grooves 16 extend from an upper end to a lower end of the cylindrical body upper portion 8 and open into the recess defining the medial portion 9 of the cylindrical body 4. Holes 40 are formed in the pipe plug 1 proximate to the interface between mounting flange 27 and the upper end of the cylindrical body upper portion 8. Holes 40 extend in axial alignment with the grooves 16 formed in the outer surface 32 of the upper portion 8 of body 4.

The grooves 16 are typically formed to be smooth walled. The diameter of the grooves 16 is sized smaller than the diameter of the screws 15 such that the threads of the screws 15 bite into and engage the portion of the cylindrical body upper portion 8 surrounding the grooves 16 when the screw 15 is driven through one of the holes 40 with the pipe plug 1 positioned in a pipe 2 that is just slightly larger in internal diameter than the outer diameter of the cylindrical body 4. Simultaneously, the thread of each screw 15 also bites into the inner surface of the pipe 2 as the screw 15 is driven downward through hole 40 and along groove 16.

In operation, the plug 1 is inserted into the end of a pipe 2, shoulder 10 first, until the flange 27 abuts against the end of the pipe 2. Screws 15 are then driven downward through holes 40 and along grooves 16. As each screw 15 is rotated by a driver, its thread bites into the upper portion 8 of the body 4 around the associated groove 16 and simultaneously into the inner surface of the pipe 2 securing the plug 1 to the pipe 2. When the ends of the screws 15 are driven past the lower end of the cylindrical body upper portion 8, the ends of the screws 15 contact an upper surface of the compression collar 14.

As the screws 15 are driven yet further downward the ends thereof press against the compression collar 14 forcing the collar 14 downward to press against and compress the seal 12 between the collar 14 and shoulder 10. As the seal 12 is compressed downward against the shoulder 10, it tends to roll slightly downward along the sloped surface of the shoulder 10, thereby expanding outward. In addition, as the seal 12 is compressed it is flattened and expanded laterally so that the outer edge of the seal 12 contacts the inner wall of the pipe 2. This forms a tight seal capable of withstanding increased liquid or gaseous pressure. In a preferred embodiment, the lower ends of the screws 15 are preferably blunt to act to drive the compression ring downward instead of biting into the compression ring 14 and drawing it upward away from the seal 12.

Use of the threaded fasteners 15 facilitates installation of the plug 1 in that the installer may use a commonly available power screw driver to tighten or loosen the threaded fasteners 15 to install or release the plug 1 from the pipe 2. Driving the screws 15 through holes 40 and along grooves 16 acts to both compress the seal 12 and threadingly couple the plug 1 to the inner surface of the pipe 2 providing a relatively strong and air-tight connection between the plug 1 and the pipe 2.

It is to be understood that while certain forms of this invention have been illustrated and described, it is not limited thereto except insofar as such limitations are included in the following claims and allowable equivalents thereof. For example, although the grooves or channels 16 are shown as smooth walled, it is anticipated that the grooves could be threaded. In addition, it is foreseen that the grooves could extend completely within the cylindrical body upper portion 8 such that the screws would not be exposed to or threadingly engage an inner surface of the pipe 2.

It is also foreseen that the coupling assembly could be utilized for plumbing fittings or devices other than plugs. For example, the device as shown could be utilized without the closure member 22 and with a thread formed on the inner surface of the bore 18 to permit use of the coupling assembly to supply a threaded coupling for an otherwise smooth walled pipe, without permanently threading the inner surface of the pipe (except for any threading caused by the screws 15 if exposed to the inner surface of the pipe 2). Alternatively, using the device without the closure member 22, the inner surface of the bore 18 could be formed to function as a glue hub to facilitate gluing additional items thereto, without permanently adhering such an element directly to the pipe 2.

It is also foreseen that the closure member 22 could be connected to the cylindrical body 4 by a thin web of material to facilitate separation of the closure member from the cylindrical body 4 if so desired. Alternatively, the closure member could be formed with some other form of removable structure to create an opening through the closure member 22.

Having thus described the invention, what is claimed as new and desired to be secured by Letters Patent is as follows:

1. A coupling assembly securable in the open end of a pipe having a bore defined by a cylindrical inner wall, said coupling assembly comprising:
    a cylindrical body including an upper portion a medial portion and a shoulder; said medial portion extending below said upper portion and having an outer diameter that is smaller than an outer diameter of said upper portion; said shoulder extending below and projecting outward from said medial portion, said upper portion having a plurality of channels formed therein and extending from an upper end to a lower end of said upper portion;
    a pliable seal disposed around said medial portion upward of said shoulder;
    a collar disposed around said cylindrical body above said seal said collar having a lower surface positioned proximate said seal,
    a screw threadingly advanceable through each of said channels of said upper portion of said cylindrical body and engageable with an upper surface of said collar, each said screw threadingly advanceable downward to push said collar downward and against said seal; and
    wherein a bore extends into said cylindrical body from a lower end thereof.

2. The coupling assembly as in claim 1 wherein an upper end of said bore is closed by a closure member extending thereacross and connected to said cylindrical body.

3. The coupling assembly as in claim 2 wherein said closure member is positioned at an upper end of said cylindrical body.

4. A coupling assembly securable in the open end of a pipe having a bore defined by a cylindrical inner wall said coupling assembly comprising:
    a cylindrical body including an upper portion a medial portion and a shoulder; said medial portion extending below said upper portion and having an outer diameter that is smaller than an outer diameter of said upper portion; said shoulder extending below and projecting outward from said medial portion, said upper portion having a plurality of channels formed therein and extending from an upper end to a lower end of said upper portion;
    a pliable seal disposed around said medial portion upward of said shoulder;
    a collar disposed around said cylindrical body above said seal said collar having a lower surface positioned proximate said seal,
    a screw threadingly advanceable through each of said channels of said upper portion of said cylindrical body and engageable with an upper surface of said collar, each said screw threadingly advanceable downward to push said collar downward and against said seal; and
    a flange projecting radially outward from said upper portion of said cylindrical body.

5. The coupling assembly as in claim 4 wherein said shoulder slopes outward and downward from said medial portion.

6. The coupling assembly as in claim 5 wherein an outer diameter of said shoulder does not exceed an outer diameter of said upper portion of said cylindrical body.

7. The coupling assembly of claim 4, wherein one or more of said screws threadingly engage the inner wall of the pipe when threadingly advanced to engage an upper surface of said collar.

8. A coupling assembly securable in the open end of a pipe having a bore defined by a cylindrical inner wall, said coupling assembly comprising:
    a cylindrical body including an upper portion a medial portion and a shoulder; said medial portion extending below said upper portion and having an outer diameter that is smaller than an outer diameter of said upper portion; said shoulder extending below and projecting outward from said medial portion,
    a seal encircling said medial portion of said cylindrical body at a position proximate said shoulder,
    a compression collar encircling said medial portion of said cylindrical body above and proximate said seal,
    means for moving said compression collar downward to engage said seal and compress said seal between said compression collar and said shoulder to outwardly deform said seal; and
    wherein a bore extends into said cylindrical body from a lower end thereof.

9. The coupling assembly as in claim 8 wherein an upper end of said bore is closed by a closure member extending thereacross and connected to said cylindrical body.

10. The coupling assembly as in claim 9 wherein said closure member is positioned at an upper end of said cylindrical body.

11. A coupling assembly securable in the open end of a pipe having a bore defined by a cylindrical inner wall, said coupling assembly comprising:
   a cylindrical body including an upper portion a medial portion and a shoulder; said medial portion extending below said upper portion and having an outer diameter that is smaller than an outer diameter of said upper portion; said shoulder extending below and projecting outward from said medial portion,
   a seal encircling said medial portion of said cylindrical body at a position proximate said shoulder,
   a compression collar encircling said medial portion of said cylindrical body above and proximate said seal,
   means for moving said compression collar downward to engage said seal and compress said seal between said compression collar and said shoulder to outwardly deform said seal, and
   a flange projecting radially outward from said upper portion of said cylindrical body.

12. The coupling assembly as in claim 11 wherein said shoulder slopes outward and downward from said medial portion.

13. A coupling assembly securable in the open end of a pipe having a bore defined by a cylindrical inner wall, said coupling assembly comprising:
   a cylindrical body including an upper portion and a medial portion extending below said upper portion of said cylindrical body and having an outer diameter which is smaller than an outer diameter of said upper portion, said cylindrical body further including a shoulder projecting downward and outward from a lower end of said medial portion;
   a peripheral flange formed at said upper end of said cylindrical body upper portion and projecting radially outward therefrom;
   said upper portion of said cylindrical body having a plurality of screw receiving grooves formed in an outer surface thereof;
   a pliable, annular seal disposed around said cylindrical body adjacent said lower portion of said cylindrical body;
   a collar disposed around said medial portion of said cylindrical body above said seal and having a lower surface adjacent said seal;
   a screw threadingly advanceable through each of said screw receiving grooves in said cylindrical body, a lower end of each screw adavanceable into engagement with an upper edge of said collar for driving said collar downward against said seal, squeezing said seal against said lower portion and causing said seal to protrude radially outward.

14. The coupling assembly as in claim 13 wherein each said screw has an external thread which is larger in diameter than said associated screw receiving groove in said cylindrical body.

15. The coupling assembly as in claim 14 wherein the upper portion of the cylindrical body is sized relative to the pipe such that when each said screw is driven into the associated screw receiving groove said thread of each screw bites into said cylindrical body adjacent said groove and into the inner wall of the pipe.

16. The coupling assembly as in of claim 13, wherein a bore extends into said cylindrical body from a lower end thereof.

17. The coupling assembly as in claim 16 wherein an upper end of said bore is closed by a closure member extending thereacross and connected to said cylindrical body.

18. The coupling assembly as in claim 17 wherein said closure member is positioned at an upper end of said cylindrical body.

19. A pipe plug securable in the open end of a pipe having a bore defined by a cylindrical inner wall, said pipe plug comprising:
   a cylindrical body having a shoulder projecting downward and outward from a lower end thereof;
   a mounting flange projecting outward from an upper portion of said cylindrical body for engagement with an end of a pipe into which said pipe plug is to be secured;
   a pliable, annular seal disposed around said cylindrical body above said shoulder;
   a collar disposed around said cylindrical body above said seal;
   a plurality of screws each threadingly advanceable through a screw receiving groove in said cylindrical body, a lower end of each said screw advanceable into engagement with an upper edge of said collar for driving said collar downward against said seal, pressing said seal against said shoulder and causing said seal to protrude radially outward.

20. A pipe plug securable in the open end of a pipe having a bore defined by a cylindrical inner wall, said pipe plug comprising:
   a cylindrical body having a shoulder projecting downward and outward from a lower end thereof;
   a mounting flange projecting outward from an upper portion of said cylindrical body for engagement with an end of a pipe into which said pipe plug is to be secured;
   a pliable, annular seal disposed around said cylindrical body above said shoulder;
   a collar disposed around said cylindrical body above said seal;
   a plurality of screws each extending through a hole in said flange and threadingly advanceable into engagement with an upper edge of said collar for driving said collar downward against said seal, pressing said seal against said shoulder and causing said seal to protrude radially outward.

* * * * *